United States Patent [19]

Blackiston

[11] Patent Number: 4,790,097
[45] Date of Patent: Dec. 13, 1988

[54] BAIT CUTTING DEVICE

[76] Inventor: Lester N. Blackiston, 6 N. 18th St., Richmond, Va. 23223

[21] Appl. No.: 159,181

[22] Filed: Feb. 23, 1988

[51] Int. Cl.[4] .............................................. A01K 97/04
[52] U.S. Cl. ......................................... 43/4; 269/302.1
[58] Field of Search ............................. 43/1, 4; 17/70; 269/302.1, 289

[56] References Cited

U.S. PATENT DOCUMENTS

| 1,099,996 | 6/1914 | Parsons | 269/289 |
| 2,609,024 | 9/1952 | Russ | 269/289 |
| 4,041,964 | 8/1977 | Shamoon | 269/302.1 |

Primary Examiner—M. Jordan

[57] ABSTRACT

A totally portable fishing equipment device to facilitate the clean and self-contained preparation of cut bait for the sports angler comprising a solid octagonal cutting block whose perpendicular planar sides coact with the sloping inner walls and bottom of the permanently attached tub or reservoir while the invention is being used aboard a sport fishing vessel moving from one fishing location to another. The interaction between the octagonal cutting block and the sloping inner walls and bottom of the tub or reservoir prevent the standard angler's cutting tool from bouncing or leaping out of the trough of the tub or reservoir when the invention is sustaining vibrations caused by the motion of a sport fishing vessel without the attention of the mate or angler. The totally portable, self-contained, deep-welled, water-tight tub or reservoir made of plastic, wood, metal or other material will collect all cuttings and wastes associated with bait preparation thereby protecting carpeting, upholstery, bright work and other components of contemporary and traditional sport fishing vessels. The solid, octagonal cutting block provides the sports angler with a firm, durable surface on which to fillet, chunk, strip, cut, or otherwise prepare bait. The halyard attached to the boat snap with eye swivel which is attached to the through-reservoir grommet provides easy carrying, over-the-side clean-up, and hang-up drying and storage.

7 Claims, 4 Drawing Sheets

BAIT CUTTING DEVICE

BACKGROUND OF INVENTION

This invention relates to a fishing equipment device to facilitate the clean and portable and self-contained preparation of cut bait for the sports angler. In general the invention comprises an octagonal cutting block secured by means of fasteners to a round, deep-welled tub or reservoir, wherein the rounded inclined inner walls and bottom of the tub or reservoir interact with the perpendicular, planar faces of the solid octagonal cutting block to prevent a standard angler's cutting tool from leaping or bouncing out of the tub or reservoir when the said invention is being used aboard a sport fishing vessel which is moving from one fishing location to another.

A major problem associated with the preparation of fresh bait is the mess which accompanies filleting bait fish, stripping squid, chunking bait fish, cutting bloodworms, and preparing other fresh bait. Blood, viscera, and other wastes from the preparation process stain and soil cockpit fitting, brightwork, gunwales, transoms and other parts of a contemporary fishing vessel. The same waste also makes decks slippery. Fishermen often cut bait on any object available to them when they are aboard a contemporary fishing vessel. With fillet knives or other standard angler's cutting tools the fishermen hack and ruin gunwales, transoms, seat cushions, cooler tops, or the like.

It is one object of this invention to provide at a reasonable cost to the angler a solid octagonal cutting block secured to a totally portable, water-tight, self-contained tub or reservoir for the clean and facile preparation of fresh bait. The tub or reservoir acts as a self-contained collector of the blood, viscera and other wastes associated with preparing fresh baits. The solid octagonal cutting block is an ever-ready planar surface for the preparation of cut bait. The said waste can either be disposed of at a convenient time or collected to be recycled as fresh chum.

Another object of this invention is to ensure that the cutting block is properly treated with fish oil concentrates and other natural oils so that during the preparation of fresh bait the bait being prepared does not pick up foreign odors distractive to fish sought by the angler.

Further, for portability, over-the-side clean-up, and hang-up drying and storage a nylon halyard is attached to a boat snap with eye swivel which in turn is attached to the tub or reservoir through a grommet which has been stamped through the side of the tub or reservoir.

BRIEF SUMMARY OF INVENTION

The invention comprises a solid octoganol cutting block secured to a portable, self-contained, water-tight, deep-welled, rounded tub or reservoir by means of at least five marine compatible fasteners.

To ensure no seepage from the reservoir, the nails or fasteners are ringed in neoprene washers. For portability, over-the-side clean-up, and hang-up drying and storage a halyard is attached to a boat snap with eye swivel which is attached to a through-reservoir grommet.

DETAILED DESCRIPTION OF INVENTION

The invention shown in FIGS. 1 to 12 comprises a solid, octagonal, cutting block (1) secured to a deep-welled, portable, self-contained, water-tight, circular tub or reservoir (2). The cutting block (1) is a thick piece of wood or other durable material with a finely sanded, planar surface and shaped octagonally to coact with the circular shape of the tub or reservoir (2). The tub or reservoir (2) is a deep-welled, durable and flexible, water-tight, totally portable, circular container made of plastic or other comparable material that has pressed into the upper lip of its opposing sides insets (6) to be used as handles, and a generally, tapered, concave spout (7) also molded into the top side of the tub or reservoir (2).

The cutting block (1) is placed proportionately in the approximate center of the tub or reservoir (2) at a predetermined distance to allow for maximum use of the tub or reservoir (2) for the collection of blood, viscera, and other waste associated with the preparation of bait.

A vital interaction between the sloping inner walls and the bottom of the tub or reservoir (2), and the perpendicular, planar faces of the solid, octagonal cutting block (1) occurs when a standard angler's cutting tool is laid on an angle in the tub or reservoir (2) during preparation of bait. The octagonal shape of the cutting block (1) works uniquely with the circular shape of the tub or reservoir (2) to ensure that the standard angler's cutting tool does not leap or bounce out of the tub or reservoir (2) when the sport fishing vessel on which the invention is being used is in motion travelling from one fishing location to another. It is common for sport fishing vessels to frequently relocate in search of good fishing grounds. After countless prototypes of the invention the inventor discerned that the octagonal cutting block (1) interacting with the sloping inner walls and bottom of the tub or reservoir (2) prevents a standard angler's cutting tool from slipping or bouncing out of the tub or reservoir (2) when the invention is on a sport fishing vessel that is in motion or otherwise relocating itself. Often during such relocation maneuvers neither mate or angler is able to keep his attention on his bait, as he is needed to steer the vessel. Even unattended the standard angler's cutting tool resting in the tub or reservoir (2) when the vessel is in motion, will not leap or bounce.

Figure 1:
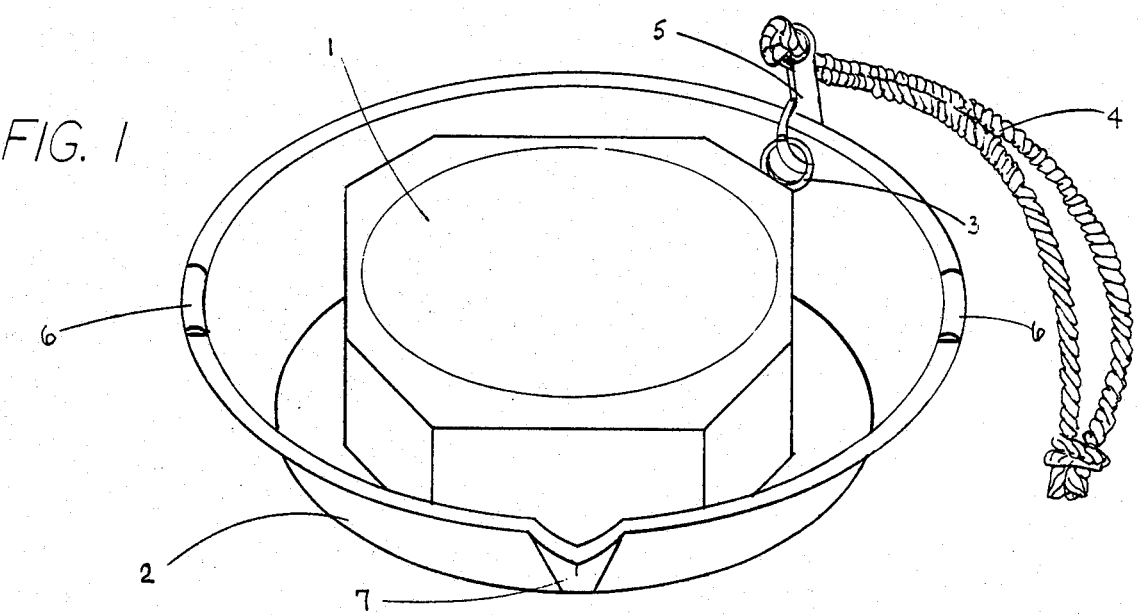
FIG. 1 Isometric view of present invention.
Figure 2:
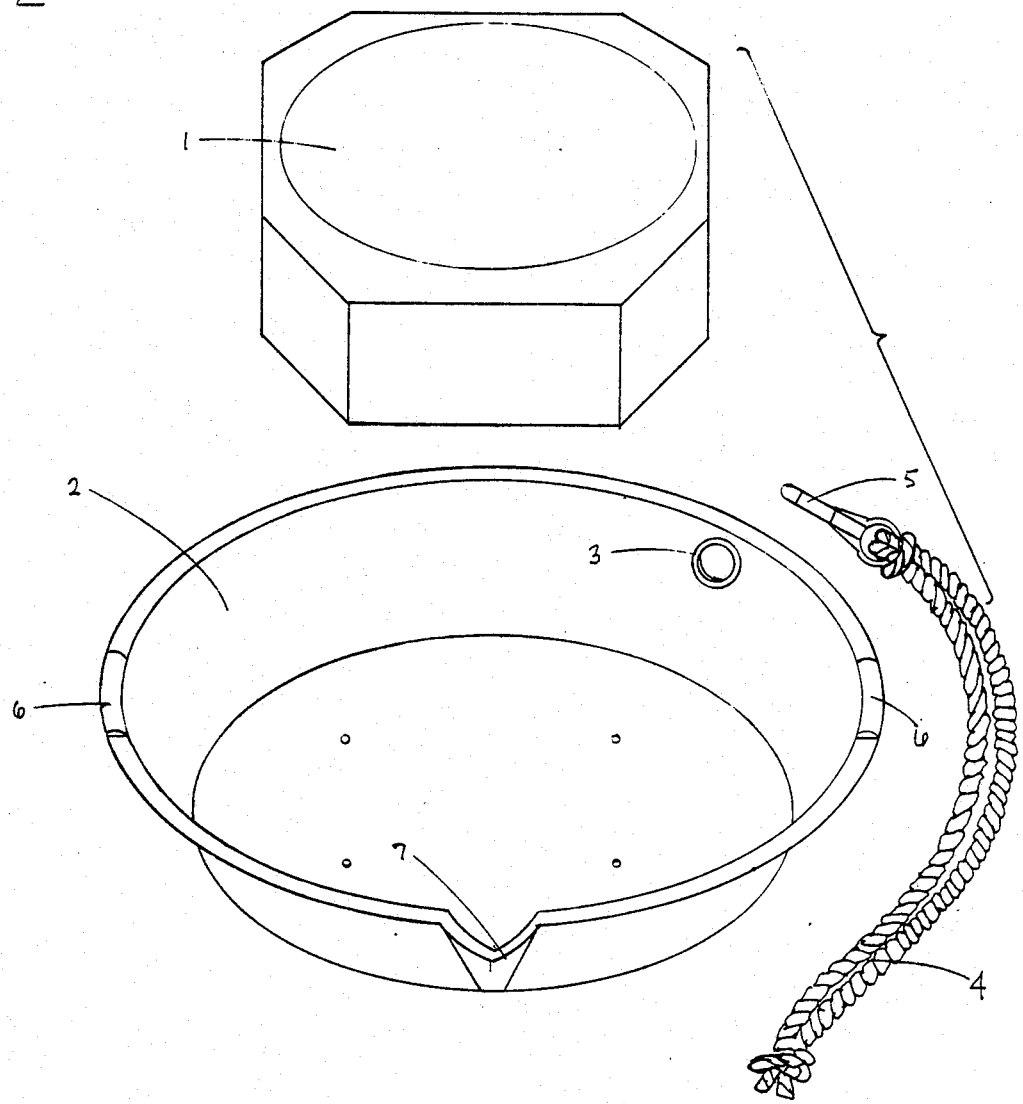
FIG. 2 Exploded isometric view, showing the two major coactive elements of present invention.
Figure 3:
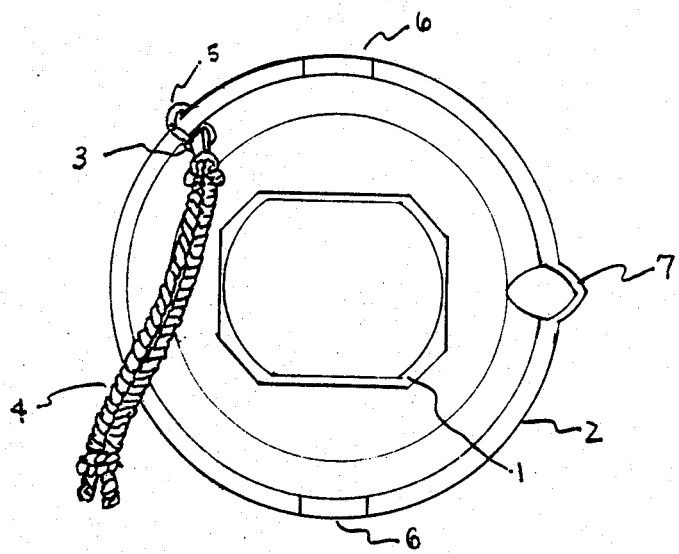
FIG. 3 Top view of present invention.
Figure 4:
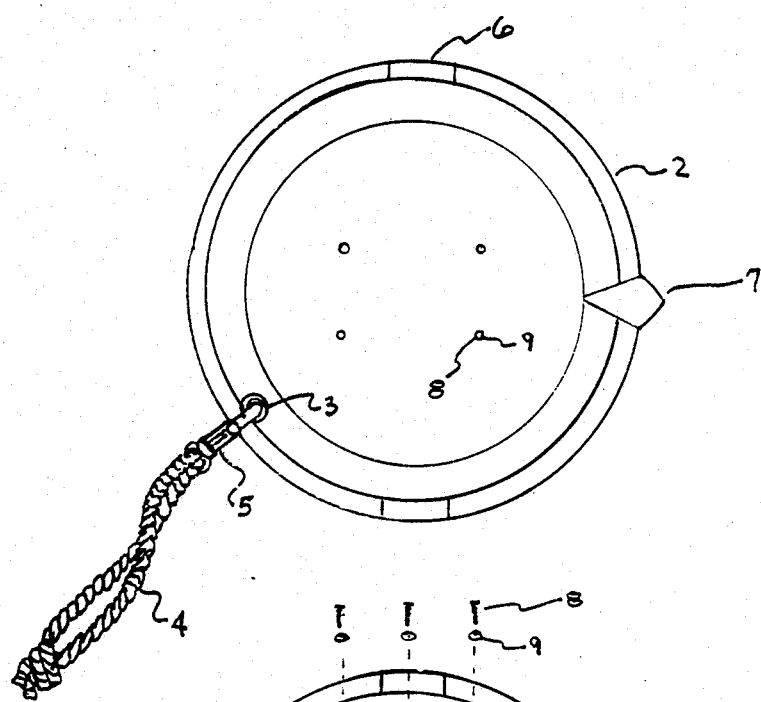
FIG. 4 Bottom view of present invention.
Figure 5:
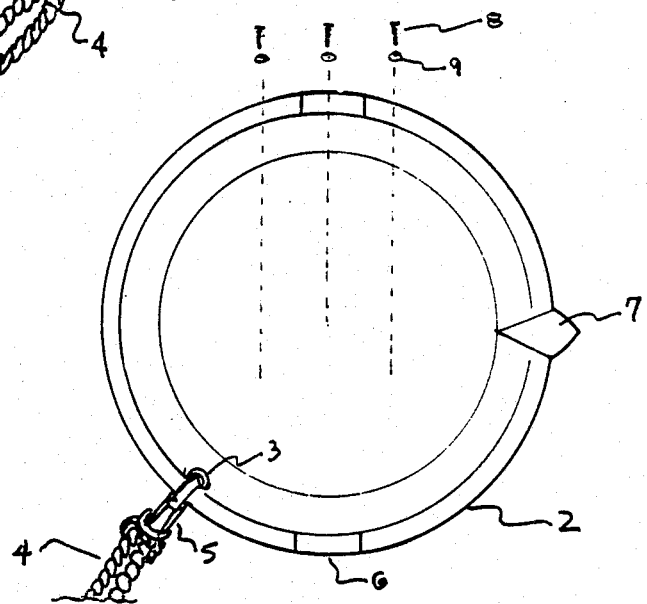
FIG. 5 Exploded bottom view, showing fasteners which permanently secure the two major coactive elements of the present invention.
Figure 6:
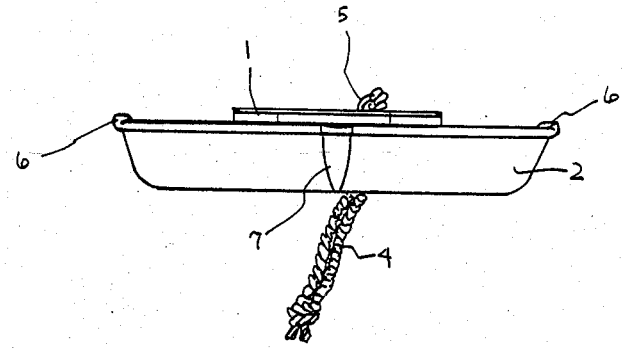
FIG. 6 One side view of present invention, showing spout and handles.
Figure 7:
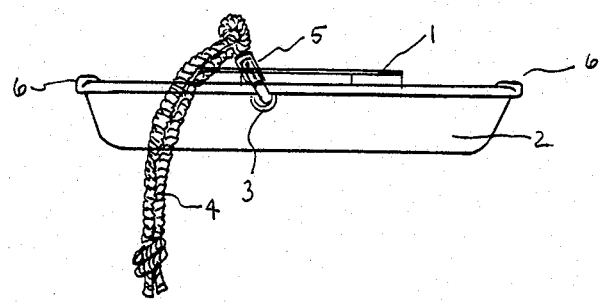
FIG. 7 One side view of present invention, showing grommet, boat snap with eye swivel and halyard.
Figure 8:
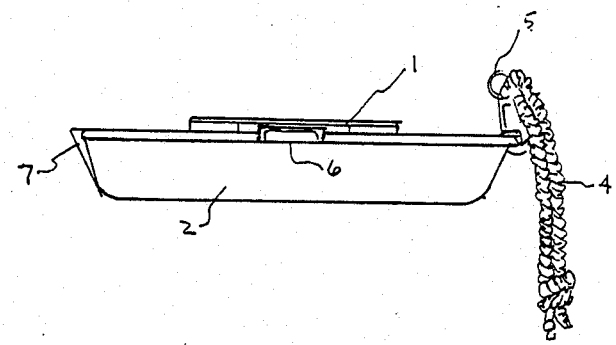
FIG. 8 One side view of present invention, showing spout, handle, and boat snap with eye swivel and halyard.
Figure 9:
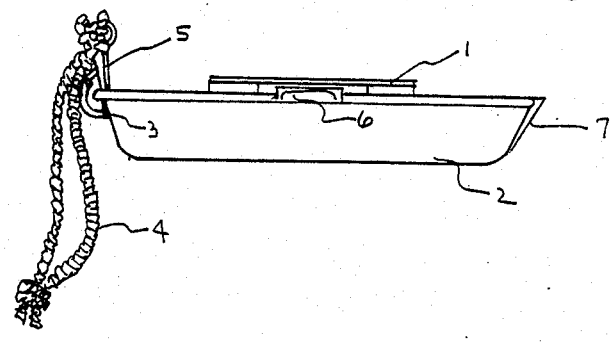
FIG. 9 One side view showing the opposing side shown in FIG. 8.
Figure 10:
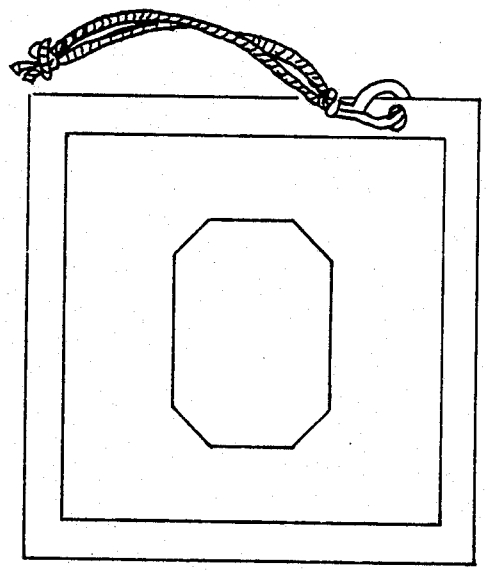
FIG. 10 Top view of another embodiment of present invention.
Figure 11:
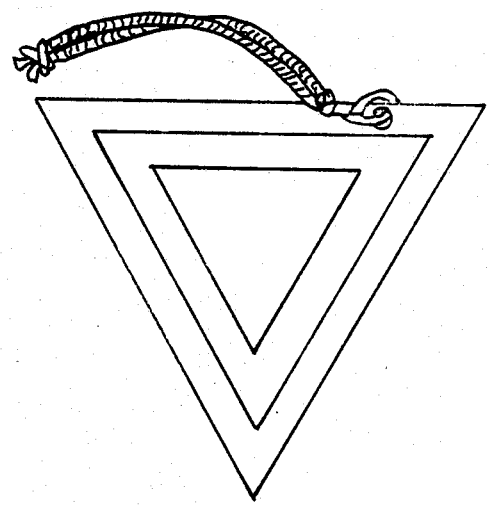
FIG. 11 Top view of another embodiment of present invention.
Figure 12:
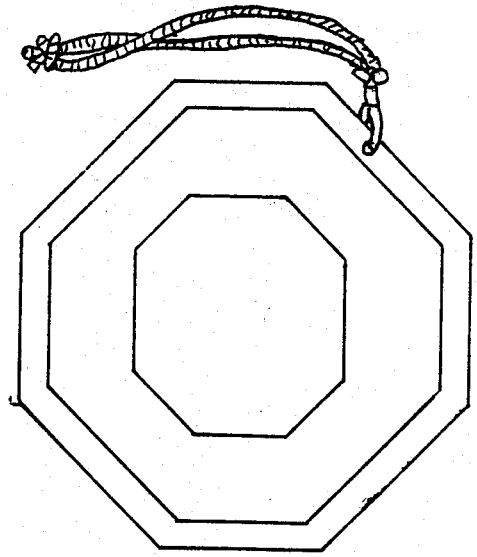
FIG. 12 Top view of another embodiment of present invention.

The inventor had determined that alternate tub or reservoir (2) shapes, other than the circular configuration, also properly interact with the octagonal shape of the cutting tool (1). Small versions of the invention incorporating other tub or reservoir (2) shapes are shown in FIGS. 10 to 12. The three alternate shapes are: square, triangular and octagonal.

The octagonal cutting block (1) provides a firm, durable, planar surface on which the sports angler can cut or strip or filler or chunk any potential bait. The octagonal cutting block (1) shall be formed of a hand-finished, finely sanded wood block, octagonally shaped and treated with fish oil concentrates such as Tung oil supplied by Fornby's and sardine and soy bean oil supplied by Beach Crest and other natural oils. Other polymers, plastics or hard rubbers or resins may be substituted for wood in the construction of the octagonal cutting block (1) The cutting block (1) must always be of an octagonal shape in order for it to properly coact with the sloping inner walls and bottom of the tub or reservoir (2).

When wood is used in the construction of the solid octagonal cutting block (1) the said block (1) shall be treated with a prescribed mixture of fish oil concentrates and other natural oils. It has been determined by the inventor that the mixture of fish oil concentrates and other natural oils applied to the cutting block (1) ensure that bait being prepared on the cutting block (1) does not pick up scents that are distractive to the fish anglers seek.

The totally portable, self-contained, deep-welled, water-tight tub or reservoir (2) shall surround the cutting block (1) at a predetermined and proportionate distance to provide a deep and sufficiently wide trough area where blood, viscera and other wastes associated with the preparation of cut bait can be collected. Equally important this distance is predetermined to ensure a holding area for the standard angler's cutting tool to prevent slippage of the tool when the invention is employed on a sport fishing vessel relocating from one fishing ground to another—the vibration caused by the sport fishing boat in motion has a tendency to cause the tool to leap or bounce out of the tub or reservoir (2) without the coactive relationship between the octagonal cutting block (1) and the sloping inner walls and bottom of the tub or reservoir (2).

The totally portable, self-contained, deep-welled, water-tight tub or reservoir (2) automatically collects all of the blood, viscera and other wastes associated with bait preparation. With the use of this invention carpeting, upholstery, brightwork, decks and so on customary on contemporary sport fishing boats are protected from the mess associated with bait preparation.

The octagonal cutting block (1) is affixed to the tub or reservoir (2) so that the planar surface of the cutting block (1) does not rise above the upper lip of the tub or reservoir (2). This configuration prevents the prepared bait resting on the planar top surface of the cutting block (1) from slipping or blowing off the invention when said invention is employed on a sport fishing vessel in motion.

The planar surface of the octagonal cutting block (1) is also at a desired height to ensure that the honed blade of the standard angler's cutting tool will not come in contact with the upper lip of the tub or reservoir (2) during the preparation of bait, therby preventing the cutting tool from gouging or damaging the tub or reservoir (2).

A double-sided grommet (3) made of brass, bronze or other marine compatible material is stamped through the upper side of the tub or reservoir (2) near the lip of the same at a point opposing the spout (7). A grommet (3) is an eyelet of firm material used to strengthen and protect an opening, and through which a line can be passed or a fastening device attached.

The grommet (3) ensures the integrity of the tub or reservoir (2) at the point where the aperture is made. For carrying, over-the-side clean-up, and hang-up drying and storage a halyard (4) of nylon, polypropylene or other marine compatible line material is attached to the grommet (3) with a fastening device such as a boat snap with eye swivel (5). A halyard (4) is a marine line used for hoisting or lowering. A boat snap with eye swivel (5) is a fastening device with a spring clip and a swivel that describes a free-moving 360 degree pivot. The boat snap with eye swivel (5) or other fastening device shall be made of brass, bronze, stainless steel or other marine compatible material. To prevent unravelling, the halyard (4) is heat-fused, or otherwise secured, at both ends.

The tub or reservoir (2) shall be permanently secured to the octagonal cutting block (1) by means of no less than five nails (8) with broad, flat heads made of a material such as copper or brass which endure the rigors and corrosion of a marine environment. A nail (8) is a usually pointed and headed fastener which is to be pounded into a material. The nails (8) used in this invention are sufficiently long and thick to ensure a permanent bond between the octagonal cutting block (1) and the tub or reservoir (2).

To ensure that no seepage occurs from the tub or reservoir (2) at the point where the nails (8) have been hammered through the tub or reservoir (2) and into the octagonal cutting block (1) washers (9) of a water-tight material such as neoprene are placed on the shafts of the nails (8) before they are driven into the bottom of the octagonal cutting block (1). A washer (9) is a flat ring used to ensure tightness and prevent leakage. After extensive experimentation the inventor chose a washer (9) with a ring large enough so that the head of the nail (8) can be countersunk into the aperture of the washer (9). This flange of the washer (9) serves as a protection to the brightwork, upholstery and so on of the contemporary sport fishing vessel from the head of the nails (8) on the bottomside of the invention.

In preparing bait on this totally portable fishing equipment device to facilitate the clean and portable and self-contained preparation of cut bait the angler places squid or fish or other potential bait on the finely sanded, planar surface of the octagonal cutting block (1). With a fillet knife or other standard angler's cutting tool the angler then cuts or strips of fillets or chunks the bait and scrapes the blood, viscera and other wastes off the said cutting block (1) and into the totally portable, self-contained, deep-welled, water-tight tub or reservoir (2) where such wastes are collected for disposal at a convenient time or recycled as fresh chum. The bait is then cut on the flat, firm, solid octagonal cutting block (1) into the desired shape for the general preparation of bait to be attached to terminal tackle of any sort—hook, clamp, trap, or the like. When the angler is finished using the invention for the preparation of bait he may lower the self-contained tub or reservoir (2) into the water with the convenient halyard (4) attached to the tub or reservoir (2) by the boat snap with eye swivel (5) which is attached to the through-reservoir grommet (3).

This halyard (4) also allows the angler to easily tote the invention and hang it up for convenient drying and storage.

It should be understood that the preceding disclosure is for the purpose of illustration and explanation only and that this invention includes all modifications and equivalents which fall within the scope of the appended claims.

I claim:

1. A totally portable fishing device to facilitate cleaning and providing a self-contained area to cut bait for an angler comprising: a solid octagonal cutting block whose planar bottom is attached to a tub or reservoir having up standing walls and said cutting block being permanently attached to the bottom of said tub or reservoir, the octagonal cutting block's shape will uniquely interact with said tub or reservoir to prevent the angler's cutting tool from bouncing or leaping out of the tub or reservoir when the device is vibrated by the motion of a sport fishing vessel.

2. A totally portable fishing device as claimed in claim 1 wherein neoprene washers are placed around attaching nails to ensure water tightness after the nails are driven through apertures in the bottom of the tub or reservoir into said octagonal cutting block.

3. A totally portable fishing equipment device as claimed in claim 1 wherein a prescribed mixture of fish oil concentrates and other natural oils are applied to a finely sanded planar surface of the cutting block where bait is to be prepared thereby rendering this surface through its interaction with the prescribed mixture of oils an ideal bait preparation surface where it is ensured that the natural bait will not pick up foreign odors distractive to fish being sought by the angler.

4. A totally portable fishing device as claimed in claim 1 wherein the tub is circular.

5. A totally portable fishing device as claimed in claim 1 wherein the tub is square.

6. A totally portable fishing device as claimed in claim 1 wherein the tub is triangular.

7. A totally portable fishing device as claimed in claim 1 wherein the tub is octagonal.

* * * * *